US008553159B2

(12) United States Patent  
Carmichael (10) Patent No.: US 8,553,159 B2  
(45) Date of Patent: Oct. 8, 2013

(54) RADIO FREQUENCY POWERED REMOTE CONTROL

(75) Inventor: Les Carmichael, Littleton, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

(21) Appl. No.: 13/401,291

(22) Filed: Feb. 21, 2012

(65) Prior Publication Data

US 2013/0215331 A1     Aug. 22, 2013

(51) Int. Cl.  
*H04N 5/44* (2011.01)

(52) U.S. Cl.  
USPC ........... 348/734; 320/108; 320/114; 320/166; 340/12.5; 340/12.25

(58) Field of Classification Search  
USPC .......... 348/734; 320/108, 167, 114; 340/12.5, 340/12.22, 12.25  
See application file for complete search history.

(56) References Cited

U.S. PATENT DOCUMENTS

2009/0262254 A1* 10/2009 Reams ........................ 348/734  
2012/0013296 A1*  1/2012 Heydari et al. ............. 320/108  
2012/0161721 A1*  6/2012 Neethimanickam ......... 320/167

* cited by examiner

*Primary Examiner* — Michael Lee  
(74) *Attorney, Agent, or Firm* — Kilpatrick Townsend & Stockton LLP (57) ABSTRACT

Described herein is a remote control for controlling audio/visual equipment. The remote control may include an input device, a transmitter, and a power generation device. The input device may be for receiving commands from a user. The transmitter may be for transmitting instruction signals to audio/visual equipment, where the instruction signals may be based at least in part on the commands received from the user. The power generation device may be for providing power to the transmitter. The power generation device may receive at least a first radio frequency signal and convert at least the first radio frequency signal into direct current power.

14 Claims, 6 Drawing Sheets

RADIO FREQUENCY POWERED REMOTE CONTROL

BACKGROUND

In the mid-1980's remote controls started to become more commonplace in homes. Since then, the use of remote controls has proliferated at an unprecedented pace, with many households having multiple remote controls for different devices throughout the home. A secondary industry that has benefited from the increased use of remote controls is the battery industry.

Typically, a remote control might use one or more AAA, AA, 9-Volt size, or other sized battery. These batteries will only last for so long, due both to their own life expectancy and also depending on frequency of use. Given the increasing number of remote controls present in a particular home, the rate of battery usage by even one household can quickly become excessive.

BRIEF DESCRIPTION

In one embodiment, a remote control for controlling audio/visual equipment is provided. The remote control may include an input device, a transmitter, and a power generation device. The input device may be for receiving commands from a user. The transmitter may be for transmitting instruction signals to audio/visual equipment, where the instruction signals may be based at least in part on the commands received from the user. The power generation device may be for providing power to the transmitter. The power generation device may receive at least a first radio frequency signal and convert at least the first radio frequency signal into direct current power.

In another embodiment, a system for controlling audio/visual equipment is provided. The system may include a set top box, a remote control, and a power generation device. The set top box may include a receiver for receiving instruction signals, and a first transmitter for transmitting a radio frequency signal. The remote control may include an input device, a second transmitter, and a power generation device. The input device may be for receiving commands from a user. The second transmitter may be for transmitting instruction signals to the set top box, where the instruction signals may be based at least in part on the commands received from the user. The power generation device may be for providing power to the second transmitter, where the power generation device receives at least the radio frequency signal and converts at least the radio frequency signal into direct current power.

In another embodiment, a method for controlling audio/visual equipment is provided. The method may include receiving a first radio frequency signal. The method may also include converting the first radio frequency signal into direct current power. The method may further include powering a first transmitter with the direct current power. The method may additionally include transmitting, with the first transmitter, instruction signals to audio/visual equipment.

In another embodiment, a remote control for controlling audio/visual equipment is provided. The remote control may include a first means, a second means, and a third means. The first means may be for receiving commands from a user, and may comprise an input device. The second means may be for transmitting instruction signals to audio/visual equipment, where the instruction signals are based at least in part on the commands received from the user. The second means may comprise a transmitter. The third means may be for converting a radio frequency signal into power for the first means, and may comprise a power generation device.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other elements may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, a subroutine, a subprogram, etc. When a process corresponds to a function, its termination corresponds to a return of the function to the calling function or the main function.

The term "machine-readable medium" includes, but is not limited to portable or fixed storage devices, optical storage devices, wireless channels and various other mediums capable of storing, containing or carrying instructions and/or data. These mediums may include both transitory and non-transitory storage mediums.

A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor or processors may perform the necessary tasks.

The term "audio/visual equipment" is used throughout this disclosure, and is intended to describe any audio and/or visual equipment for delivering audio and/or visual images to a user. Such equipment may include, merely by way of example, a television, image projection device, stereo, audio and/or visual receiver, satellite television receiver, cable television receiver, digital video recorder, digital video disc (DVD) player/recorder, Blue-ray™ Disc player/recorder, video cassette player/recorder, entertainment device, multimedia or other computer, streaming media device, multimedia or other tablet, multimedia or other handheld device, multimedia or other personal data assistant, and/or multimedia or other mobile phone.

The term "set top box" is used throughout this disclosure, and is intended to describe any device capable of receiving and/or sending audio and/or visual information for reproduction by audio/visual equipment. Set top boxes may include, merely by way of example, satellite television receivers and cable television receivers, including those with or without digital video recorders.

In one embodiment, a remote control for controlling audio/visual equipment is provided. The remote control may include an input device, a transmitter, and a power generation device. The input device may be for receiving commands from a user. The transmitter may be for transmitting instruction signals to audio/visual equipment, where the instruction signals may be based at least in part on the commands received from the user. The power generation device may be for providing power to the transmitter. The power generation device may receive at least a first radio frequency ("RF") signal and convert at least the first RF signal into direct current power.

The input device may include any device which is able to receive commands from a user. Merely by way of example, such devices may include keypads, switches, knobs, etc. Typical input devices may have a number pad, a channel up/down selector, a volume up/down selector, etc. In some embodiments, the input device may also include a dynamic display, which alters the effect of different buttons.

The transmitter may include any device which transmits signals remotely to audio/visual equipment. Merely by way of example, such transmitters may include RF transmission antennas/devices, infrared transmission devices, and/or any other non-wired data transmission device. The transmitter may transmit data representative of user input received by the input device, such that the audio/video equipment may act on such directions when received.

The power generation device may include any device which can receive RF signals and convert those signals into direct current power. In one example, a floating gate transistor may receive the RF signal from an antenna and output direct current power, possibly to an energy storage device as further discussed below. The power generation device may power the transmitter, as well as the input device. Any other portion of the remote control may also be powered by the power generation device. Note that the frequency of an RF signal received to power the remote control may have a different frequency than an RF signal transmitted to and/or from the remote control to pass commands and/or other information between the remote control and the audio/visual equipment. In some embodiments, the RF signals received by the remote control and processed into power may be environmental RF signals received from sources not originally intended to provide power to the remote control. For example RF signals from mobile phone service providers, wireless computer networks, and or other sources may power the power generation device in the remote control.

In some embodiments, the remote control may also have a power storage device. This power storage device may include, for example, a battery or capacitor. In these embodiments, the power storage device may be used to power all or any particular portion of the remote control, and the power generation device may supply the power storage device with a source of power.

In some embodiments, the remote control may be configured to monitor the current power level of power storage in the power storage device. If the power level is at or below a predetermined level of capacity, the remote control (or more specifically, a processor therein) may be configured to cause the transmitter to transmit a power request signal. The power request signal may direct an external RF signal generator to begin emitting an RF signal that may be received by the power generation device. Note that the external RF signal generator may be integral with, or external to, a set top box or other piece of audio/visual equipment that the remote control is communicating with.

Essentially, this may allow the remote control to preempt the possibility of running out of power. Once the power storage device is at maximum capacity, or some other higher level of charge, the remote control (or more specifically, a processor therein) may be configured to cause the transmitter to transmit a power-full signal. This may cause the external RF signal generator to cease delivery of the aforementioned RF signal.

In other embodiments, an external RF signal generator may operate either continuously or intermittently in a manner different than described above. Examples of other intermittent manners of operation include activation of the RF signal generator whenever activity by the remote control is detected. For example, while the remote control is not being used, the RF signal generator may not be active (or may activate only so long to fill a power storage device). When activity is detected, the RF signal generator may activate so long as a command is transmitted by the remote control at least once for a predetermined interval of time. The RF signal generator may deactivate once a command has not issued from the remote control for one of the predetermined intervals of time.

In another embodiment, a system for controlling audio/visual equipment is provided. The system may include a set top box, a remote control, and a power generation device. The set top box may include a receiver for receiving instruction signals, and a first transmitter for transmitting a RF signal. The remote control may include an input device, a second transmitter, and a power generation device. The input device may be for receiving commands from a user. The second transmitter may be for transmitting instruction signals to the set top box, where the instruction signals may be based at least in part on the commands received from the user. The power generation device may be for providing power to the second transmitter, where the power generation device receives at least the RF signal and converts at least the radio frequency signal into direct current power.

In another embodiment, a method for controlling audio/visual equipment is provided. The method may include receiving a first radio frequency signal. The method may also include converting the first radio frequency signal into direct current power. The method may further include powering a first transmitter with the direct current power. The method may additionally include transmitting, with the first transmitter, instruction signals to audio/visual equipment.

In another embodiment, a remote control for controlling audio/visual equipment is provided. The remote control may include a first means, a second means, and a third means.

The first means may be for receiving commands from a user. The first means may comprise an input device and/or any other device capable of such functionality now known in the art or provided for in the future.

The second means may be for transmitting instruction signals to audio/visual equipment, where the instruction signals are based at least in part on the commands received from the user. The second means may comprise a transmitter and/or any other device capable of such functionality now known in the art or provided for in the future.

The third means may be for converting a radio frequency signal into power for the first means. The third means may comprise a power generation device and/or any other device capable of such functionality now known in the art or provided for in the future.

Figure 1:
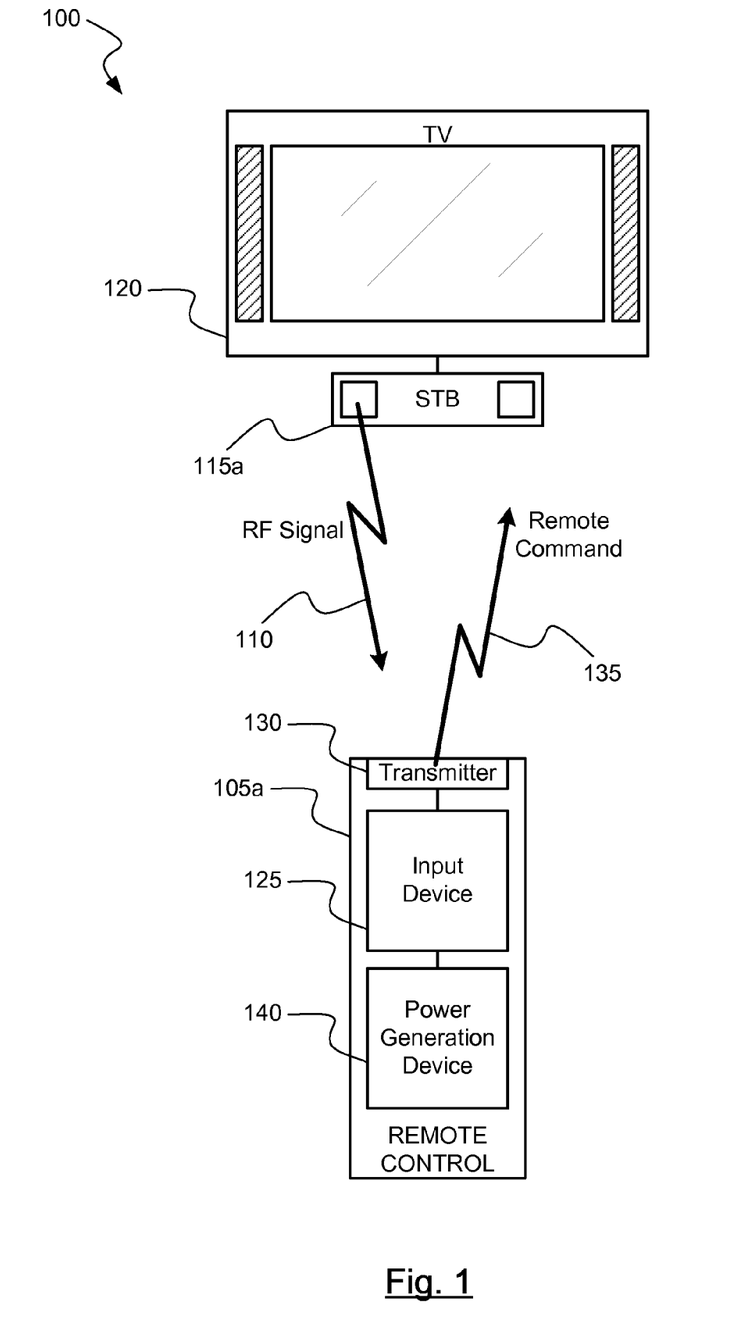
FIG. 1 is block diagram of an embodiment having a remote control which is powered from radio frequency signals generated by a set top box.

Turning now to FIG. 1, a block diagram is shown of one possible system 100 having a remote control 105 which is powered from radio frequency signals 110 generated by a set top box (STB) 115. System 100 also includes a television (TV) 120, for which content is delivered via set top box 115. While FIG. 1 illustrates a separate set top box 115, it is to be appreciated that set top box 115 functionality may be integrated with the television 120.

Remote control 105 includes an input device 125 for receiving user input, a transmitter 130 for sending remote commands 135 to set top box 115 as dictated by the user input. These remote commands, be they infrared, RF signals, or otherwise, are received by set top box 115 to control the audio/visual content delivered by television 120. Remote control 105 also includes a power generation device 140 which is capable of converting RF signals into direct current electrical power as described herein.

In operation, set top box 115 is generating and emitting RF signals 110, either continuously, or intermittently. RF signals 110 are received by power generation device 140 of remote control 105 and converted into power. Inputs by a user at input device 125 are processed by a processor controlling operation of remote control 105 (not shown), and transmitted by transmitter 130. As noted above, transmitter 130 may be any type of transmission device capable of communicating wirelessly with set top box 115. In some embodiments, transmitter 130 may be a RF transmission device, and may emit signals at a different radio frequency than those generated by set top box 115.

Transmitter 130, input device 125, and any other portion of remote control 105 may be powered by power generation device 140. In some embodiments, set top box 115 may produce RF signal 110 at lower power levels, and/or intermittently at very short intervals, during periods of non-use until a remote command 135 is received. At this point, set top box 115 may switch to a higher power delivery mode, whereby more powerful RF signals 110 are sent out, possibly in shorter intervals (or continuously). This may satisfy the power requirement of normal active use, where a user is making multiple, rapid inputs into remote control 105 (i.e., channel surfing, etc.).

Figure 2:
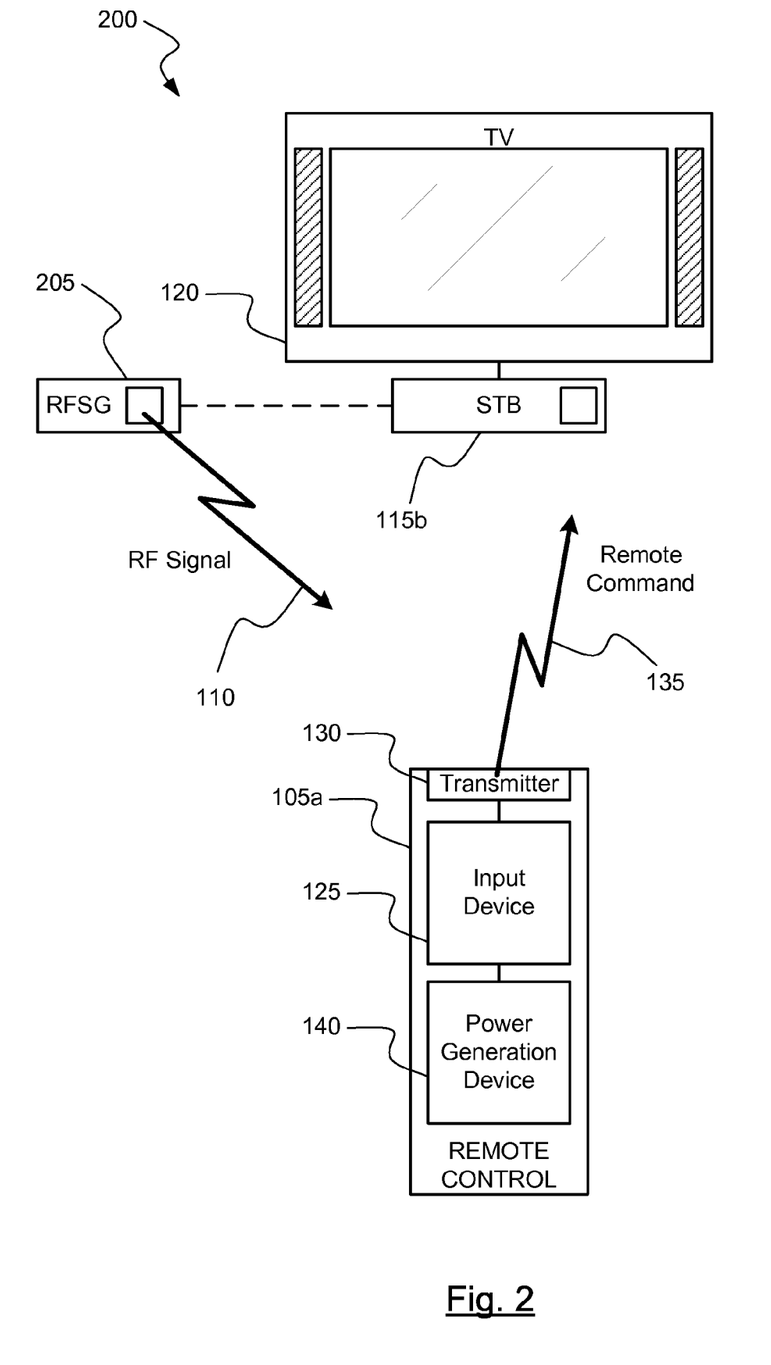
FIG. 2 is a block diagram of another embodiment having a remote control which is powered from radio frequency signals produced by a source generator not integrated with a set top box.

FIG. 2 shows a block diagram of another possible system 200 having a remote control 105 which is powered from RF signals 110 produced by a RF source generator (RFSG) 205 that is not integrated with a set top box 115. In this embodiment, RF signal generator 205 is not physically integrated with set top box 115, but may be in communication therewith, either wirelessly or via hard line connection. In other embodiments, RF signal generator 205 may not be in connection with set top box 115.

Embodiments such as those shown in FIG. 2 may be especially useful to adapt older set top boxes 115 which can be reconfigured to control an external RF signal generator 205, possibly via Universal Serial Bus (USB) or other connection available on such a legacy set top box 115. External RF signal generator 205 may therefore be configured to act [1] on its own in vis-à-vis remote control 105, [2] in conjunction with set top box 115, or [3] at the direction of set top box 115. External RF signal generator 205, in any of these modes of operation, may act as otherwise described herein.

In yet other embodiments, RF signal generator 205 is merely representative of environmental, background, and/or ambient RF signals that may be harvested by power generation device 140, and no discrete RF signal generator 205 may be necessary to power remote control 105. For example RF signals from mobile phone service providers, wireless computer networks, and or other sources may provide RF signals to power generation device 140 in remote control 105.

Figure 3:
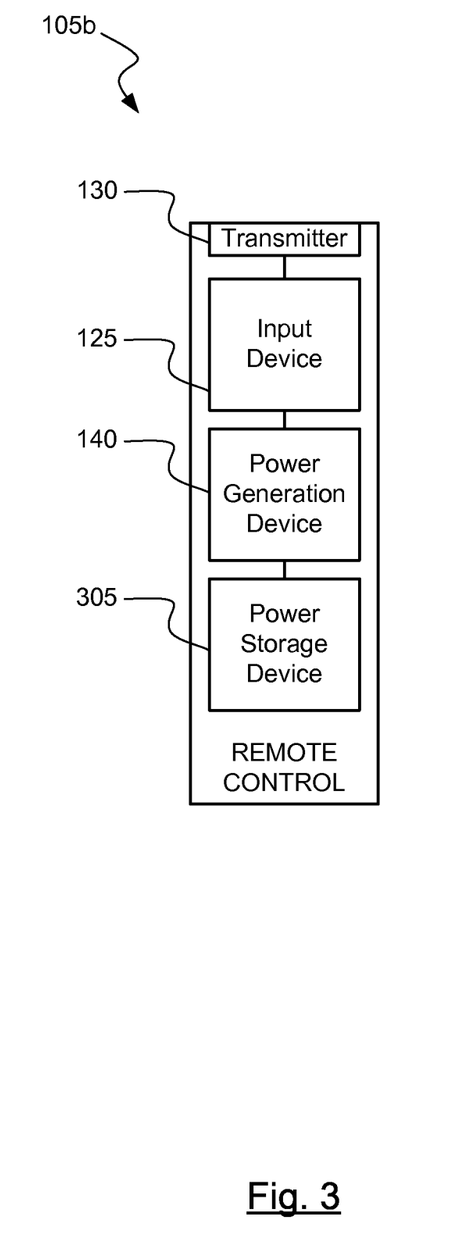
FIG. 3 is a block diagram of an embodiment having a remote control which includes a power storage device for storing electricity generated from radio frequency harvesting.

FIG. 3 shows a block diagram of an alternative remote control 105b which includes a power storage device 305 for storing electricity generated from radio frequency harvesting. This embodiment may store harvested RF power in anticipation of moments when a user desires to issue commands from remote control 105, but an RF power signal is not yet available. As described herein, remote control 105 may issue commands to set top box 115 or external RF signal generator 205 which cause it to start or stop delivering harvestable RF signals 110. In other embodiments, mere activity between remote control 105 and set top box 115 may cause RF power signals to be sent to remote control 105 for storage as energy in power storage device 305.

As discussed above, power storage device may be a battery, capacitor, or any other capable of storing direct current power. This power storage device may or may not be replaceable depending on the embodiment. For example, in some embodiments the power storage device may be a rechargeable battery and be intended to be replaced either by the end user or a service technician. In other embodiments, the power storage device may have a life cycle longer than that of other portions of the remote control, and/or be disposable along with the remote control once proper functioning of the power storage device is impaired at the end of its life cycle.

Figure 4:
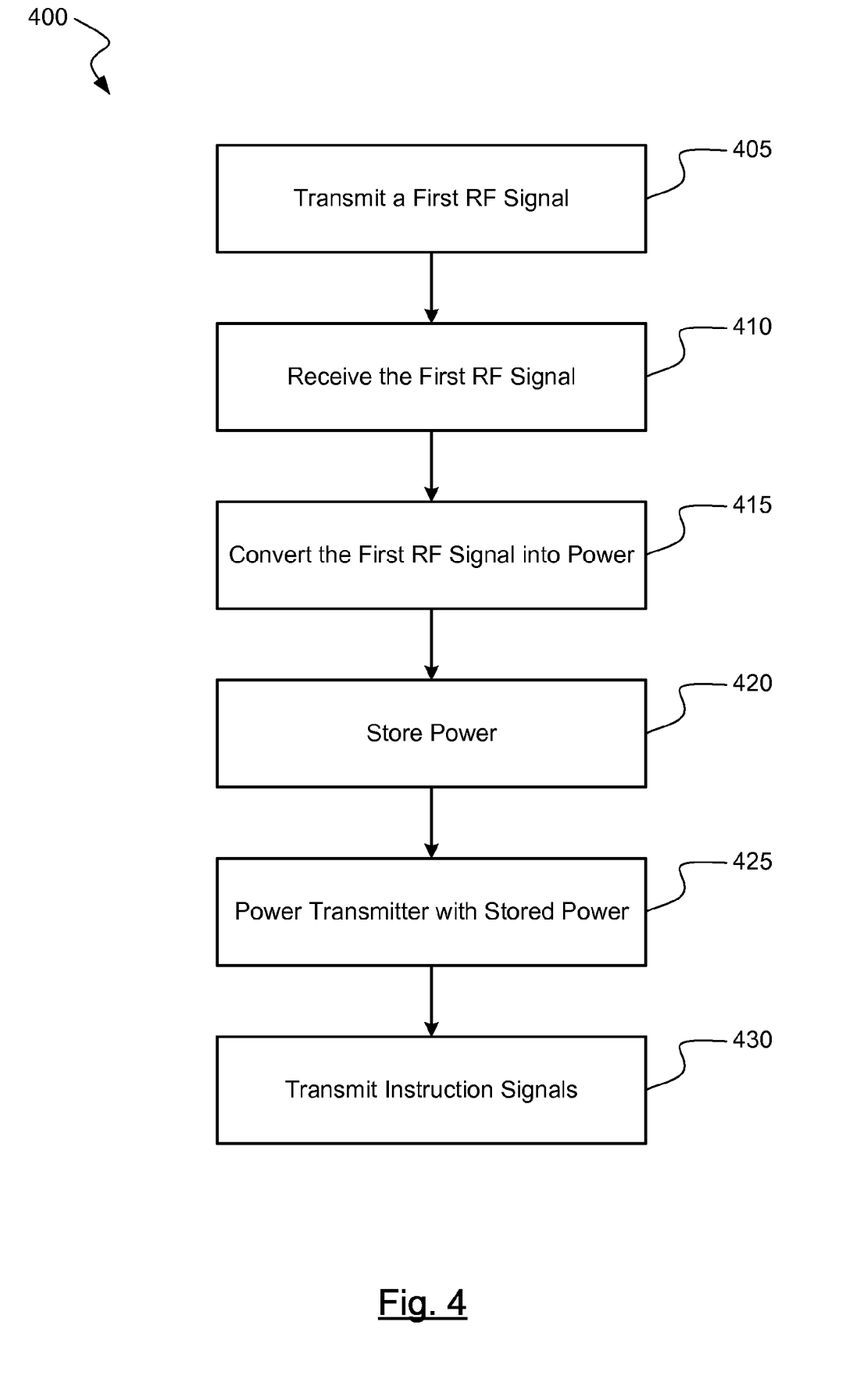
FIG. 4 is a flow diagram of one method for powering, via radio frequency harvesting, transmission of instruction signals from a remote control.

FIG. 4 shows a flow diagram of one method 400 o for powering, via radio frequency harvesting, transmission of instruction signals from a remote control. At block 405, a first RF signal is transmitted, either from a non-associated source (e.g., an environmental, background, or ambient source) or associated source (e.g., set top box, RF signal generator). At block 410, the remote control receives the first RF signal, possibly at a power generation device as described herein.

At block 415, the received first RF signal is converted into power. At block 420, this power may be stored in some embodiments. At block 425, the transmitter of the remote control is powered via either the received or stored energy from steps 415 or 420.

At step 430, the remote control transmits instruction signals, possibly in a second radio frequency, so as to differentiate between intended energy harvesting RF signals and command/instruction RF signals.

Figure 5:
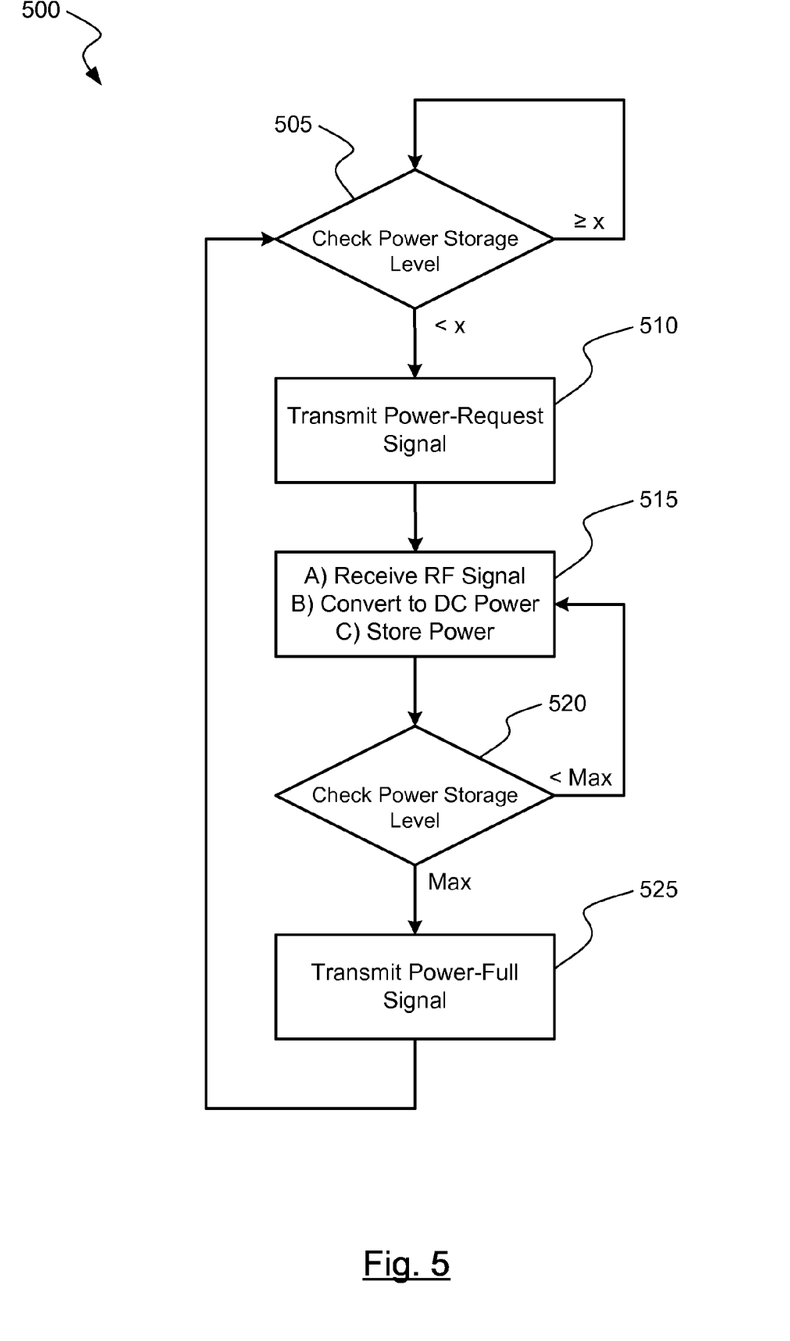
FIG. 5 is a flow diagram of one method for powering a remote control via radio frequency harvesting.

FIG. 5 shows a flow diagram of one possible method 500 for controlling an external RF signal generator for an RF harvesting remote control is shown. At block 505, the power storage level or charge of the power storage device in the remote control is checked. If the power storage level is greater or equal to a predetermined level (x), then step 505 reoccurs, either continuously, or after an interval of time. In some embodiments, x may be a full (100%) power level or charge of the power storage device. In other embodiments, x may be a lesser amount of power level or charge, for example, 90%, 80%, 70%, etc.

If at block 505 the power storage level is less than x, a power-request signal is transmitted at block 510 from the remote control to the RF signal generator or associated device. As discussed herein, the power-request signal may also be an RF signal, possibly at a different frequency than the RF signal generated by the RF signal generator. At block 515, the RF power signal is received by the remote control, converted to direct current power, and stored.

At block 520, the power storage level or charge of the power storage device is checked. If the level or charge is at less than the maximum level of the power storage device, or some other predetermined level (i.e., 90%, 80%, 70%, etc.) then charging continues at block 515. If the level or charge is at maximum level, then at block 525 a power-full signal is transmitted to the RF signal generator or associated device. The process begins anew at block 505, so as to recharge the power storage device after power is depleted through usage of the remote control.

Figure 6:
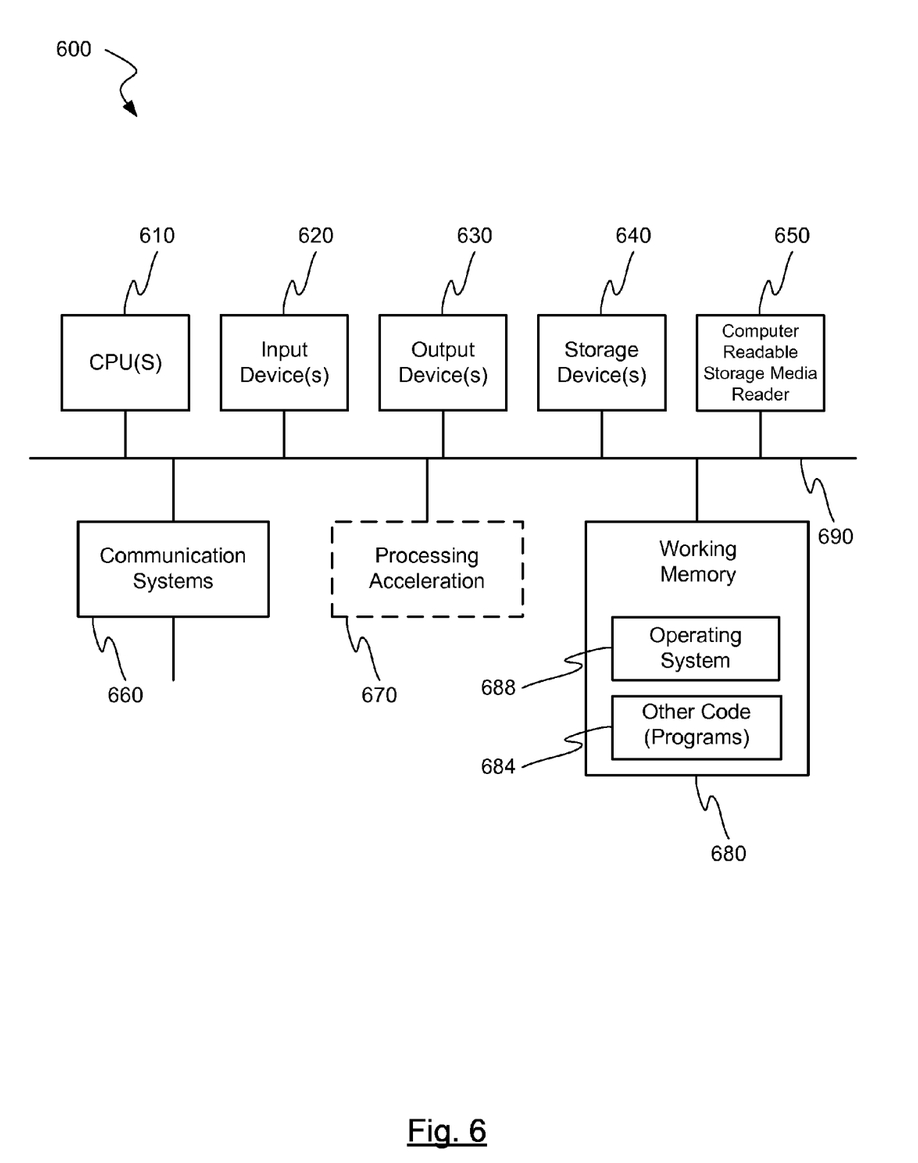
FIG. 6 is a block diagram of an exemplary computer system capable of being used in at least some portion of the apparatuses or systems described herein, and/or implementing at least some portion of the methods described herein.

FIG. 6 is a block diagram illustrating an exemplary computer or processing system 600 in which embodiments described herein, or portions of embodiments described herein, may be implemented. Computer or processing system 600 may be used, in whole, in part, or with various modifications, to provide the functions of the audio/visual equipment, the remote control, the set top box, the RF signal generator, the input device, the transmitter, the power generation device, the power storage device, and/or other components of the embodiments such as those discussed above. For example, various functions of the remote control may be controlled by computer or processing system 600, including, merely by way of example, receiving user inputs, instructing the transmitter, controlling the activation and/or behavior of the power generation device and power storage device, etc.

Computer or processor system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). Computer or processing system 600 may also include one or more storage device 640. By way of example, storage device(s) 640 may be disk drives, optical storage devices, solid-state storage devices such as a random access memory ("RAM") and/or a read-only memory ("ROM"), which can be programmable, flash-updateable and/or the like.

Computer or processing system 600 may additionally include a computer-readable storage media reader 650, a communications system 660 (e.g., a modem, a network card (wireless or wired), an infra-red communication device, Bluetooth™ device, cellular communication device, etc.), and working memory 680, which may include RAM and ROM devices as described above. In some embodiments, computer or processing system 600 may also include a processing acceleration unit 670, which can include a digital signal processor, a special-purpose processor and/or the like.

The computer-readable storage media reader 650 can further be connected to a computer-readable storage medium, together (and, optionally, in combination with storage device(s) 640) comprehensively representing remote, local, fixed, and/or removable storage devices plus storage media for temporarily and/or more permanently containing computer-readable information. The communications system 660 may permit data to be exchanged with a network, system, computer and/or other component described above.

Computer or processing system 600 may also comprise software elements, shown as being currently located within a working memory 680, including an operating system 684 and/or other code 688. It should be appreciated that alternate embodiments of computer or processing system 600 may have numerous variations from that described above. For example, customized hardware might also be used and/or particular elements might be implemented in hardware, software (including portable software, such as applets), or both. Furthermore, connection to other computing devices such as network input/output and data acquisition devices may also occur.

Software of computer or processing system 600 may include code 688 for implementing any or all of the function of the various elements of the architecture as described herein. For example, software, stored on and/or executed by computer or processing system 600 can provide the functions of the audio/visual equipment, the remote control, the set top box, the RF signal generator, the input device, the transmitter, the power generation device, the power storage device, and/or other components of the embodiments such as those discussed above. Methods implementable by software on some of these components have been discussed above in more detail.

A number of variations and modifications of the embodiments described herein can also be used within the scope of this disclosure. In some embodiments, the remote control could control equipment other than audio/visual equipment. Merely by way of example, the remote control could control garage door openers, manufacturing equipment, sports equipment such as ball throwers, robots or robotic elements, military equipment, cameras and video recorders, traffic control devices, and other devices where remote input by a user is necessary or advantageous.

The invention has now been described in detail for the purposes of clarity and understanding. However, it will be appreciated that certain changes and modifications may be practiced within the scope of the appended claims.

What is claimed is:

1. A remote control for controlling audio/visual equipment, wherein the remote control comprises:
    an input device configured to receive commands from a user;
    a transmitter configured to transmit instruction signals to audio/visual equipment;
    a power storage device configured to provide power to the transmitter; and
    a power generation device configured to provide power to the power storage device, receive at least a first radio frequency signal, and convert at least the first radio frequency signal into direct current power;
    wherein the instruction signals are selected from a power-request signal to request transmission of the first radio frequency signal when the power storage device is at or below a predetermined level of charge, and a power-full signal to request cease of transmission of the first radio frequency signal when the power storage device is at a threshold charge.

2. The remote control for controlling audio/visual equipment of claim 1, wherein: the power generation device is further configured to provide power to the input device.

3. The remote control for controlling audio/visual equipment of claim 1, wherein transmitting instruction signals to audio/visual equipment comprises: transmitting a second radio frequency signal, wherein the frequency of the second radio frequency signal is different than the frequency of the first radio frequency signal.

4. A system for controlling audio/visual equipment, wherein the system comprises:
    an entertainment device comprising:
        a receiver configured to receive instruction signals;
        a first transmitter configured to transmit a radio frequency signal;
    a remote control comprising:
        an input device configured to receive commands from a user;
        a second transmitter configured to transmit instruction signals to the entertainment device, wherein the instruction signals are based at least in part on the commands received from the user; and
        a power generation device configured to provide power to the second transmitter, wherein the power generation device receives at least the radio frequency signal and converts at least the radio frequency signal into direct current power;
    wherein the first transmitter is inactive to transmit the radio frequency signal based on detected inactivity of the remote control by the entertainment device.

5. The system for controlling audio/visual equipment of claim 4, wherein the first transmitter is configured to activate in response to the receiver receiving instruction signals from the second transmitter.

6. The system for controlling audio/visual equipment of claim 4, Wherein the first transmitter is configured to activate when a power-request signal transmitted by the second transmitter is received by the receiver.

7. The system for controlling audio/visual equipment of claim 4, wherein the first transmitter is configured to deactivate when a power-full signal transmitted by the second transmitter is received by the receiver.

8. A method for controlling audio/visual equipment, wherein the method comprises:
    receiving a first radio frequency signal;
    converting the first radio frequency signal into direct current power;
    storing the direct current power with a power storage device;
    powering a first transmitter with the direct current power provided by the power storage device; and
    transmitting, with the first transmitter, to audio/visual equipment a sign to request cease of transmission of the first radio frequency signal when the power storage device is at a threshold charge.

9. The method for controlling audio/visual equipment of claim 8, wherein the method further comprises: transmitting the first radio frequency signal.

10. The method for controlling audio/visual equipment of claim 8, wherein transmitting instruction signals to audio/visual equipment comprises: transmitting a second radio frequency signal, wherein the frequency of the second radio frequency signal is different than the frequency of the first radio frequency signal.

11. A remote control for controlling audio/visual equipment, wherein the remote control comprises:
    a first means for receiving commands from a user;
    a second means for transmitting instruction signals to audio/visual equipment; and
    a third means for converting a radio frequency signal into power for the first means;
    wherein the instruction signals are selected from a first signal to request transmission of the first radio frequency signal when a power storage means is at or below a predetermined level of charge and a second signal to request cease of transmission of the first radio frequency signal when the power storage means is at a threshold charge.

12. The remote control for controlling audio/visual equipment of claim 11, wherein the first means comprises an input device.

13. The remote control for controlling audio/visual equipment of claim 11, wherein the second means comprises a transmitter.

14. The remote control for controlling audio/visual equipment of claim 11, wherein the third means comprises a power generation device.

* * * * *